Patented June 23, 1931

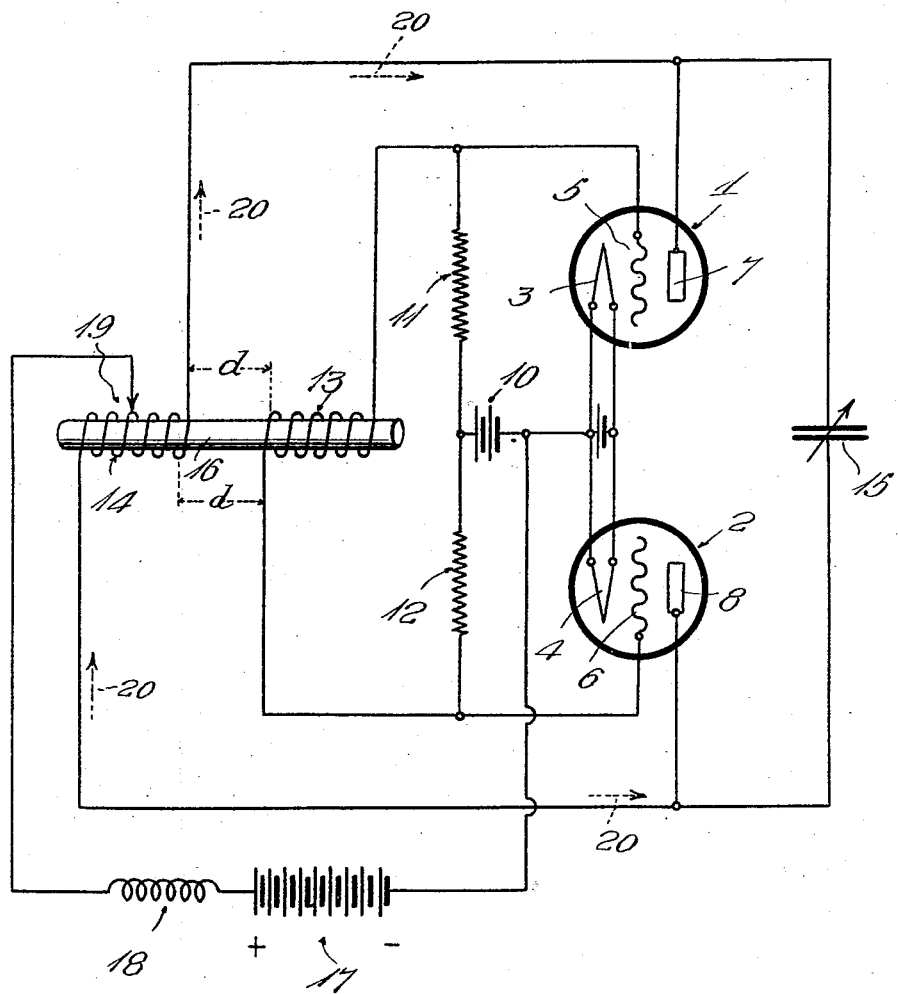

1,811,127

UNITED STATES PATENT OFFICE

JAMISON R. HARRISON, OF MIDDLETOWN, CONNECTICUT, ASSIGNOR TO WIRED RADIO, INC., OF NEW YORK, N. Y., A CORPORATION OF DELAWARE

BALANCED MAGNETOSTRICTIVE OSCILLATOR

Application filed December 11, 1928. Serial No. 325,368.

My invention relates to circuit arrangements in general and more specifically to circuit arrangements for producing high frequency electrical energy.

An object of my invention is to provide a high frequency circuit arrangement wherein the generated energy has a constant and steady frequency.

Another object of my invention is to provide a circuit arrangement employing electrically balanced thermionic tubes and wherein the frequency of the generated energy is substantially uniform.

Still another object of my invention is to provide a circuit arrangement wherein a magneticstriction member is employed in combination with a balanced arrangement of thermionic tubes.

A better understanding of the circuit arrangement of my invention can be had by referring to the specification following and to the accompanying drawing which illustrates the circuit arrangement of my invention.

In the circuit arrangement shown in the accompanying drawing, a metallic rod 16 possessing magnetostrictive properties is coupled to the input and output of an electrically balanced amplifier circuit by means of inductance coils 13 and 14 respectively. Because of the magnetostrictive properties of metallic rod 16, energy is transferred from the output coil 14 to the input coil 13 through the mechanically vibrating rod 16 whereby oscillations of electrical energy are sustained in the circuits.

The constants of coils 13 and 14, namely the size and shape, depend upon the size and shape of metallic rod 16 and are most easily determined empirically. The output coil 14 is shunted by the condenser 15 forming a tuned output circuit which is tuned approximately to the resonance frequency of metallic rod 16. Coils 13 and 14 are so arranged that the distance "$d$" between them may be varied thus allowing proper adjustment of the phase relationship between input and output circuits for maximum power output. This is possible since the energy is transferred from the output to the input circuit by means of the mechanically vibrating metallic rod 16 in the form of a wave motion.

The circuit is ordinarily nonoscillatory when the magnetostrictive rod 16 is removed from coils 13 and 14, since the windings of these coils are in the same direction. The circuit may be made self oscillatory without the presence of metallic rod 16 by reversing the direction of the winding of either coil. With this latter arrangement, with the windings in opposite directions, the introduction of rod 16 will stabilize the circuit and maintain the frequency of the generated energy substantially uniform though the circuit constants may be varied over a considerable range. The source of anode supply energy 17 is connected to the anodes 7 and 8 of thermionic tubes 1 and 3 respectively through a center tap 19 on output coil 14. The choke coil 18 is an inductive reactance at the oscillation frequency of the circuit thus acting as a choke to exclude the oscillation currents from source of potential 17.

The energy in the output coil 14 is in such a direction at any given interval of time as to produce an additive effect. The direction of these currents for a given time are indicated by arrows 20. This may be best understood from the following consideration. Consider a wave motion traveling down the magnetostrictive rod 16. This causes a change in the length of metallic rod 16 and because of its magnetostrictive properties a magnetic field is set up in coil 13. This magnetic field induces a current in the coil. Let us assume that the current is in such a direction that a positive charge is impressed on control electrode 5 whereby the current at the anode 7 is increasing as shown by the arrows 20. At the same time a negative charge is impressed on control electrode 6 of thermionic tube 2 causing the current at anode 8 to diminish. As these currents flow into the output coil 14, they are in the same direction and produce an additive effect. A source of control electrode biasing potential 10 is connected to control electrodes 5 and 6 of thermionic tubes 1 and 2, respectively, through the resistors 11 and 12. Resistors 11 and 12 may be replaced by choke coils. Cathodes 3 and 4 of thermionic tubes 1 and 2 are energized from source 9. The temperature coefficient of the oscillation frequency of the circuit depends upon the nature of the magnetostrictive rod 16. The frequency can be made practically independent of temperature however by enclosing metallic rod 16 and the coils 13 and 14 in a thermostatically controlled compartment. Higher frequencies can be obtained from this circuit by making use of the harmonics of the fundamental frequency characteristics of rod 16. This is accomplished by reversing the connections to either the output coil 14 or to the input coil 13 and adjusting the frequency characteristics of the output circuit to approximately the frequency of the desired harmonic energy. The distance "$d$" between inductance coils 13 and 14 should be carefully readjusted to obtain the proper phase relationship of the energy in the circuits for maximum power generated.

The circuit arrangement of my invention provides an electrically balanced thermionic tube generating system wherein the generated energy is of substantially uniform frequency. The great precautions necessary to employ when using a mechanically vibratile element such as quartz having piezo electric properties, is avoided and unnecessary when the magnetostriction element is employed. Metallic rod 16 may comprise any suitable metal such as nickel, iron or alloys of chromium, iron or nickel. The physical dimensions of the magnetostriction rod are directly proportional to the wave length of the generated signaling energy or inversely proportional to the frequency.

I realize that many modifications of the circuit arrangement of my invention are possible without departing from the spirit of my invention as defined in the appended claims and it is to be clearly understood that the embodiments of my invention are not to be restricted to the foregoing specification or to the accompanying drawing but only as defined in the scope of the appended claims.

What I claim as new and desire to secure by Letters patent of the United States is as follows:

1. An electrically balanced circuit arrangement comprising in combination a plurality of thermionic tubes having cathodes, an input circuit connected between said control electrodes and said cathodes, anodes and control electrodes, an inductance included in said input circuit, an output circuit connected between said anodes and cathodes, in inductance connected in said output circuit, the windings of said inductances having the turns thereof extending in the same directions, a rod of metal concident with the axes of said inductances and means for tuning said output circuit.

2. An electrically balanced circuit arrangement comprising in combination a plurality of thermionic tubes having cathodes, anodes and control electrodes, the cathode and control electrodes of said tubes being connected with an inductance coil, the anode and cathode electrodes of said tubes being connected with a second inductance coil, a metallic rod member extending through the electrical axes of said inductance coils and means for tuning the circuit including said second inductance coil.

3. An electrically balanced circuit arrangement comprising in combination a plurality of thermionic tubes having cathodes, anodes and control electrodes, the cathode and control electrodes of said tubes being connected with an inductance coil, the anode and cathode electrodes of said tubes being connected with a second inductance coil, a metallic rod member extending through the electrical axes of said inductance coils, means for tuning the circuit including said second inductance coil, the physical dimensions of said rod member being such as to give a free period of vibration equal to the frequency to which the circuit including said second inductance coil is tuned.

4. An electrically balanced circuit arrangement comprising in combination a plurality of thermionic tubes having cathodes, an input circuit interconnecting anodes and control electrodes, the cathode and control electrodes of said tubes, an inductance coil disposed in said input circuit, an output circuit interconnecting the anode and cathode electrodes of said tubes, a second inductance coil connected in said output circuit, said coils being adjustably positioned in respect each to the other, a metallic rod member extending through the electrical axes of each of said inductance coils and means for tuning said output circuit over a frequency range to which said metallic rod member is responsive.

5. An electrically balanced circuit arrangement comprising in combination a plurality of thermionic tubes having cathodes, anodes and control electrodes, the cathode and control electrodes of said tubes being connected with an inductance coil, the anode and cathode electrodes of said tubes being connected with a second inductance coil, said coils being adjustable in spacial relation, a magnetostrictive metallic member extending through the electrical axes of said inductance coils and means for tuning the circuit including said second inductance coil over a range of frequencies to which said magnetostrictive member is responsive.

6. An electrically balanced circuit arrangement comprising in combination a plurality of thermionic tubes having cathodes, anodes and control electrodes, an input circuit including the cathode and control electrodes of said tubes, an inductance coil connected in said input circuit, an output circuit including the anode and cathode electrodes of said tubes, a second inductance coil connected in said output circuit, means for adjustably tuning one of said circuits through a predetermined range of frequencies, a magnetostrictive member coincident with the electrical axes of said inductance coils, the spacial relation of said coils being adjustable along said magnetostrictive member, the physical dimensions of said magnetostrictive member being such as to give a free period of vibration to the frequency to which said circuits are adjusted throughout the tuning range of said circuits.

In testimony whereof I affix my signature.

JAMISON R. HARRISON.